Aug. 31, 1926. 1,598,453
J. SCOTT-TAGGART
MODULATION SYSTEM FOR RADIO TRANSMISSION APPARATUS
Filed July 5, 1921
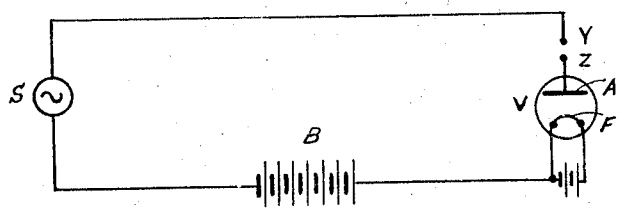
Fig. 1.
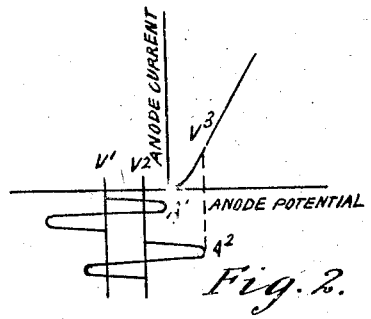
Fig. 2.
Fig. 3.
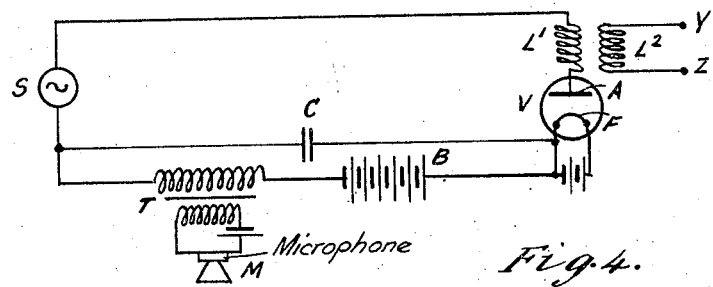
Fig. 4.
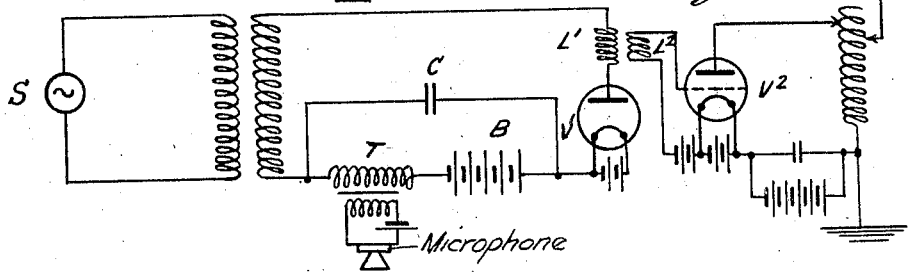
Fig. 5.
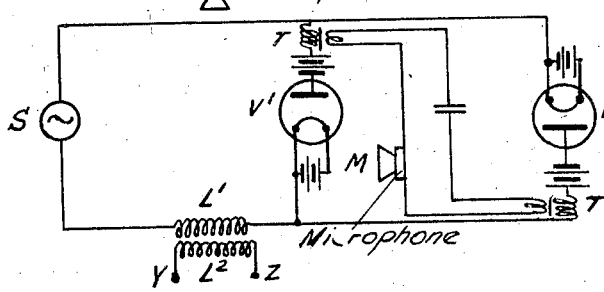
Fig. 6.
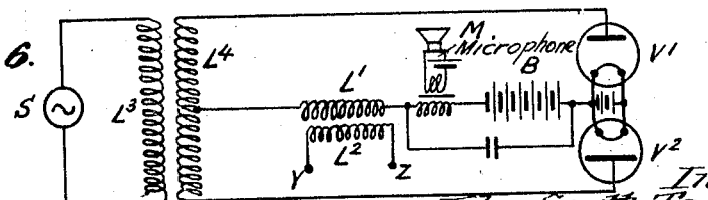
Inventor
John Scott-Taggart
By
Attorney Patented Aug. 31, 1926.

1,598,453

UNITED STATES PATENT OFFICE.

JOHN SCOTT-TAGGART, OF LONDON, ENGLAND.

MODULATION SYSTEM FOR RADIO TRANSMISSION APPARATUS.

Application filed July 5, 1921, Serial No. 482,529, and in Great Britain August 10, 1920.

This invention relates to signaling systems, particularly radio signaling systems. The invention is particularly concerned with wireless transmitting systems and in part provides a system of radio telephony or other form of signaling in which an alternating or oscillating current is modulated. Thermionic amplifiers having grids have previously been used as variable conductors but the present invention uses rectifiers for a like purpose. The rectifier has preferably unilateral conductivity but must have asymmetrical conductivity. Various types of rectifier are suitable but I prefer to use two-electrode valves or electron discharge devices. The scope of the invention will be more clearly seen from the descriptions which follow. If a two-electrode valve be connected in series with a source of high-frequency energy and a source of electromotive force, the current passed through the valve will depend largely on the value of the said electromotive force.

If this is so connected that the plate of the valve is made very negative the valve will pass no current at all. If this negative voltage be made less than the amplitude of the oscillations supplied by the high-frequency generator, the valve will conduct and the current passed through it will depend within limits on the steady voltage applied to the plate of the valve. It is proposed to vary this voltage by the modulator which may conveniently be a microphone and transformer.

It may be desirable to couple the said circuit to an aerial system so that the currents passed through the valve may be communicated to the antenna. An oscillation transformer will usually be desirable, the primary being in the valve circuit and the secondary in the aerial circuit. The valve circuit may, however, be coupled in this manner or any other to the input side of an amplifying valve, the output side of which is coupled directly or indirectly to the antenna. Several amplifying valves may be used in this way. Likewise the modulating potentials may be amplified.
Various other modifications are possible without exceeding the scope of the invention and will readily occur to those experienced in the art. It is not proposed to limit the invention to the use of valves since any suitable rectifier could be employed. The invention may also be used to modulate or control incoming energy in a radio receiver.

If desired, several rectifiers may be connected in parallel, in which case the valves can be made progressively conductive by grading the negative potentials on each plate. As the plate potential rises, the valves become successively conductive.

The invention will best be understood by reference to the drawings, wherein Figs. 1 and 2 are diagrams illustrative of the principle involved in the invention; Fig. 3 shows the application of the invention to wireless telephony; Fig. 4 a modification of same embodying the use of an amplifier; and Figs. 5 and 6 further modifications employing two rectifying devices.

Fig. 1 shows a source of varying current which in wireless transmission will be radio frequency current. A thermionic valve V having an anode A and cathode F is connected in series with the source S, an output circuit being connected across the terminals Y, Z. A source of steady potential B gives the anode of the rectifier V a negative potential. The current passed by V will now depend on the negative potential on the anode A. Fig. 2 will make this clearer. This figure shows the anode voltage—anode current curve $V'$, $V^2$, $V^3$ of a two-electrode valve. If we assume that the voltage of B is sufficiently negative to bring the crest $A'$ of the positive half-cycle to the foot of the curve, the valve will conduct no current supplied by S. The steady negative potential on the anode may be called the base-line potential and in this case is represented by $V'$. If we lessen the base-line potential (now shown as $V^2$), the positive half-cycle $A^2$ will more than overcome the negative potential $V^2$ and the representative point on the curve will endeavor to move up to $V^3$. The rectifier V will now pass positive high-frequency pulses which may be used in the output circuit. The magnitude of this output current will depend on the base-line potential. The output circuit may be an impedance.

Fig. 3 shows the application of the invention to a wireless telephone. The output terminals Y, Z are now part of an output radio frequency transformer $L'$, $L^2$. A microphone M and transformer T in series with the battery B enable the anode base-line potential to be varied. The condenser C is for by-passing high-frequency currents. The output from Y, Z is a high-frequency modulated one which will vary as the microphone is spoken into. The base-line potential may be anything from V' to zero (Fig. 2) but will usually be V'. When not speaking, there is no output.

Fig. 4 shows a complete wireless telephone system in which the modulated potentials are amplified by the valve V². The high-frequency currents are shown being induced into the coupling circuit containing the modulating valve V'. Although single rectifiers are shown, yet two such rectifiers could be used to conduct both half-cycles of oscillating current. Fig. 5 for example, shows the use of two rectifying valves in opposition. Each valve operates in the manner shown in Figs. 3 and 4. Fig. 6 is a somewhat different arrangement which acts as a conductor of both half oscillations. The high-frequency current is supplied by S through a transformer L³, L⁴.

In any of these arrangements several valves may be connected in parallel in the ordinary way.

The invention is not intended to be confined to transmitting systems, but may be used in receiving systems.

It is to be understood that the rectifier is merely used as a variable conductor and its rectifying properties are not used in the normal way a rectifier is used in wireless signaling systems.

As there are so many possible methods of carrying the invention into effect and further applications of its use, it has been only thought necessary to give a few examples, but it is not desired to restrict the invention to such examples.

Having thus described the nature of the said invention and the best means I know of carrying the same into practical effect, I claim:—

1. The method of modulating radio frequency currents, according to which the unmodulated radio frequency currents are impressed upon a rectifying valve having two electrodes only, the anode of which has a steady negative potential and the value of this potential is varied by impressed modulating waves.

2. In a radio-signalling system, a modulating device comprising a two-electrode rectifier, a source of steady potential having its negative pole connected with the anode of said rectifier, a source of unmodulated radio frequency currents and a source of modulating currents connected in series with each other and with the said rectifier and source of steady potential, and a condenser directly bridging said sources of steady potential and of modulating currents.

3. A radio-signalling system comprising a source of radio frequency currents, a two-electrode valve rectifier in series therewith acting as a variable conductor between an input and an output circuit, a source of steady potential in series with the rectifier and the source of radio frequency currents and having its negative pole connected with the anode of said rectifier, an impedance in series with the rectifier and with the sources of radio frequency currents and of steady potential, and means for varying the potention across the rectifier microphonically.

In testimony whereof I have signed my name to this specification.

JOHN SCOTT-TAGGART.